July 23, 1940. J. O. GETTE, JR 2,208,865
AUTOMATIC CLUTCH OPERATION FOR MOTOR VEHICLES
Filed June 5, 1940  5 Sheets-Sheet 1

INVENTOR
JOHN O. GETTE, JR.
BY
Bartlett Eyre Scott & Keel
ATTORNEYS

July 23, 1940.    J. O. GETTE, JR    2,208,865
AUTOMATIC CLUTCH OPERATION FOR MOTOR VEHICLES
Filed June 5, 1940    5 Sheets-Sheet 2

INVENTOR
JOHN. O. GETTE. JR.
BY
Bartlett Eyre Scott Keel
ATTORNEYS

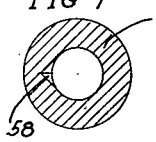
Fig. 7.
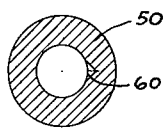
Fig. 8.
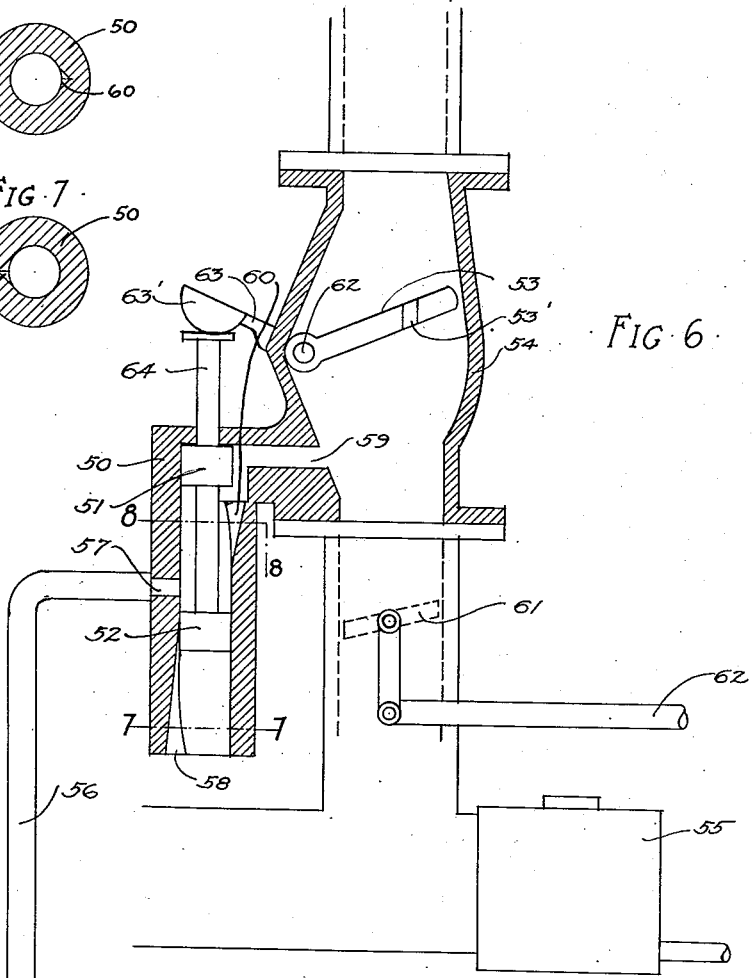
Fig. 6.
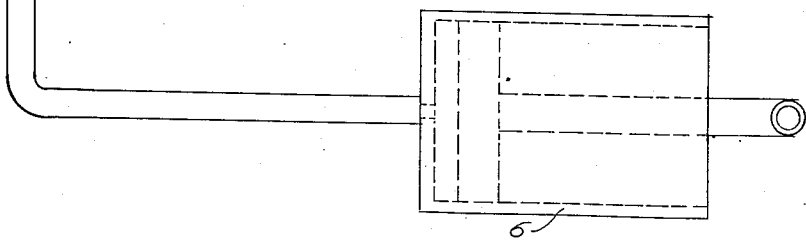
INVENTOR
JOHN O. GETTE JR.
BY
ATTORNEYS July 23, 1940.  J. O. GETTE, JR  2,208,865
AUTOMATIC CLUTCH OPERATION FOR MOTOR VEHICLES
Filed June 5, 1940  5 Sheets-Sheet 4

INVENTOR
JOHN O. GETTE JR.
BY
ATTORNEYS

July 23, 1940. J. O. GETTE, JR 2,208,865
AUTOMATIC CLUTCH OPERATION FOR MOTOR VEHICLES
Filed June 5, 1940 5 Sheets-Sheet 5

INVENTOR
JOHN O. GETTE JR.
BY
Bartlett Eyre Scott & Keel
ATTORNEYS

Patented July 23, 1940

2,208,865

UNITED STATES PATENT OFFICE 2,208,865

AUTOMATIC CLUTCH OPERATION FOR MOTOR VEHICLES

John O. Gette, Jr., Greens Farms, Conn., assignor to Jalma West, New York, N. Y.

Application June 5, 1940, Serial No. 339,034

43 Claims. (Cl. 192—.01)

This invention relates to clutch control systems for motor vehicles and the like.

One object of the invention is a system of the character indicated whereby the clutch may be operated in a smooth and effective manner relieving the driver of the necessity for manually operating the clutch. A further object of the invention is an automatic system whereby the clutch may be operated selectively at the will of the operator to suit the different conditions of operation, namely to provide for a gentle or soft operation of the clutch when that is desired and to provide for a more abrupt and positive operation thereof under other conditions. A still further object of the invention is a clutch operating system operated by fluid pressure, and particularly such a system embodying the features above indicated. A further object of the invention is a power operated clutch system including a means responsive to acceleration for controlling or modifying the operation of the power operated means, whereby smooth and even starting may be effected. A further object of the invention is a power operated clutch system which is responsive to the acceleration rate and deceleration rate. A further object of the invention is a system of this general character which is characterized by its simplicity in construction and by its reliability and dependability in operation.

For a better understandng of the invention reference may be had to the accompanying drawings wherein:

Fig. 6 shows a still further modification of the invention;

Figs. 7 and 8 are sectional views of Fig. 6; and

Figure 1:
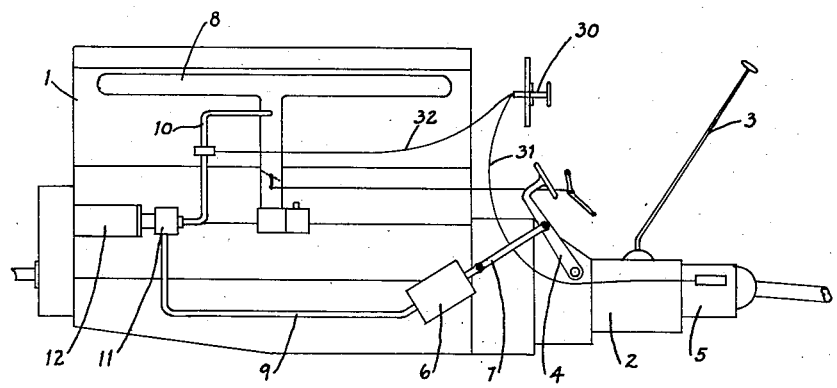
Fig. 1 shows more or less diagrammatically a system embodying one form of the invention as applied to a car with a free wheeling unit located at the rear of the transmission.
Figure 3A:
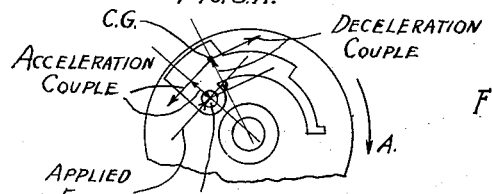
Fig. 3a is a diagram showing the acceleration and deceleration forces.
Figures 2, 3:
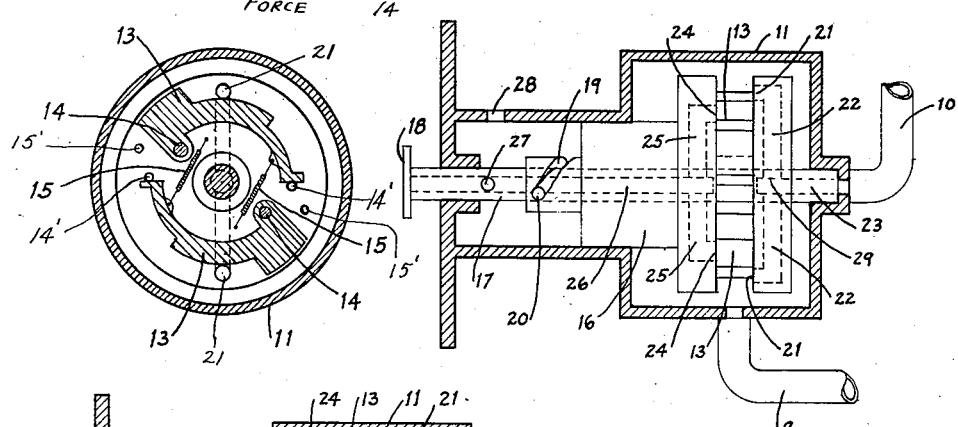
Fig. 2 shows a section through an element of the control.
Fig. 3 shows a sectional view at right angles of Fig. 2.

Referring to Figs. 1 to 3, I have shown my system as applied to a motor vehicle power plant including an engine 1 and a transmission 2. I have a hand gear shift lever 3 and a clutch pedal 4. A free wheeling unit is indicated at 5.

The clutch pedal 4 is automatically operated by a piston and cylinder unit 6, the piston being connected with the clutch pedal by a connecting link 7. The piston 6 is operatively connected with the manifold 8 of the engine through pipes 9 and 10 and a special controlling unit 11 is interposed between the pipes 9 and 10. This unit 11 is driven by the engine from any convenient point, such as at the rear of the generator indicated at 12. The controlling unit 11 comprises a centrifugal and inertia governor which derives its action from engine speed and engine acceleration and deceleration. The governor controls a three-way valve between the manifold 8, the atmosphere and the operating cylinder 6. The governor is somewhat diagrammatically illustrated at 13 and comprises two centrifugal weights which are pivoted at 14 and have their opposite ends restrained by springs 15. These weights 13 are carried by a rotatably mounted drum 16, which, in turn, is mounted upon a drive shaft 17 which is journalled in the casing and is provided with a coupling 18 for driving the same. The drum 16 is keyed to the drive shaft 17 through helical slot pin drive connections comprising the helical slot 19 formed in an extension of the sleeve 16 and a pin 20 rigid with the shaft 17.

Figure 2A:
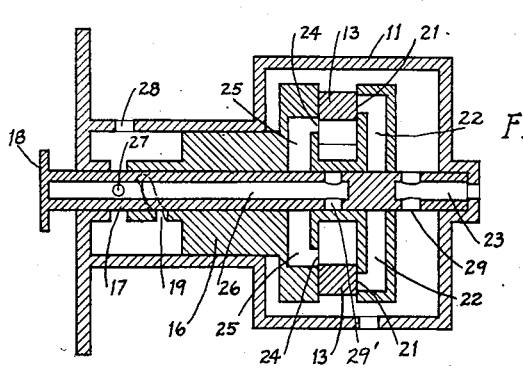
Fig. 2a is a view similar to Fig. 2.

The three-way valve control effected by the inertia governor is as follows:

The governor weights 13 control two pairs of ports; one pair 21 leading through radial passages 22 to the axial passage 23 in the shaft 17, which axial passage leads to the pipe connection 10; the other pair of ports 24 leading through radial passages 25 to an axial passage 26 formed in the other end of the shaft 17. This latter passage leads out through opening 27 into the casing of the controller and from thence through an opening 28 to the atmosphere. When the inertia part of the controller moves over toward the left, as indicated in Fig. 2a, the port 29, which normally registers with the passage 22, is opened to the interior of the casing and from thence to the pipe 9, connecting pipes 9 and 10 together which disengages the clutch.

The operation is as follows:

Assume the car in neutral with the engine idling. The fly weights 13 are now in toward the center of rotation due to the tension of the springs. There is now a direct passage from the intake manifold 8 to the cylinder 6 through the controller, through passage 23, port 29, passages 22, ports 21 and pipe 9. By shifting into low gear and accelerating the engine, the weights then swing out due to the greater centrifugal force and gradually close the intake openings 21 and uncover the atmosphere openings 24 allowing the piston in the vacuum cylinder to move out, thereby engaging the clutch.

When it is desired to shift gears the foot is removed from the accelerator and the car free wheels. The engine then slows up due to compression. Due to the rotational inertia of the controller on the shaft 17, it tends to rotate at its original speed and since there is a loose drive 19, 20 between the shaft and the unit it will turn relatively to the shaft a predetermined amount depending on the length of the helical slot 19 and will move the unit on the shaft to the left thereby closing the passage 25 from the shaft to the unit on the atmosphere side through port 29' and opening the port 29 on the intake side. The vacuum then rapidly disengages the clutch and the shift is made.

Upon accelerating the engine the reverse action takes place and the clutch is re-engaged. The speed of engagement can be controlled by the depression of the accelerator. The faster the engine goes the faster the clutch engages. It is normally arranged so that the clutch engages before the free wheeling clutch so that the drive is taken up through the latter.

The fly weights 13 are hinged in such a way as to give a small inertia effect to give smooth engagement in starting and to prevent any possibility of stalling the engine. The slowing up of the engine or the tendency of the same to stall sometimes corresponds to a rapid or jerky forward movement of the car, particularly in light cars which are overpowered and this inertia control effect smooths out the starting operation, softening or preventing such jerky movements.

When the free wheeling unit is locked out by operating the handle 30 the inertia feature of the unit due to the loose drive 19, 20 does not operate since the engine will not decelerate rapidly enough to cause this action. The centrifugal minimum speed characteristics are still in effect and hence the engine cannot be stalled at any time. An additional lockout can be employed. This consists of a simple shut-off valve in the intake pipe line and for simplicity may be connected to the free wheel lockout handle. Two positions of the handle may be used to determine which mechanism is to be locked out. Position one, for example, locks out the free wheeling unit, and further motion closes the clutch shut-off valve so the car then would be operated in the conventional manner.

A feature shown in Fig. 3 is the piston form of the unit rotating in a close fitting casing. The purpose of this is to prevent the main inertia feature from working during the engaging period. On the left side of the piston is always atmospheric pressure, while on the right the pressure is that of the cylinder. When the clutch is "out" there is a vacuum there. Due to the high helix angle of the slot the unit is held from moving to the left while there is a vacuum to the right and hence cannot turn right relative to the shaft during engagement. When both sides are under equal pressure, when the clutch is fully engaged it is comparatively free on the shaft and hence can move about the shaft. If the engine is accelerated it can move "down" the helix or to the right which is the desired action.

The following, among others, are the advantages of this system. Smooth engagement during starting with impossibility of stalling; either rapid or slow engagement at the driver's will; rapid disengagement when foot is removed from accelerator; simple lockout combined with free wheeling lockout; no connections with accelerator or throttle mechanism; no rotating bearing load on clutch throw-out bearing due to free wheeling clutch; no jerking in engagement while in motion since clutch takes hold before the free wheeling unit.

At 30 I have indicated a means for locking out the free wheeling operation and also for locking out the clutch, this device having suitable operating connections 31 and 32 leading respectively to the free wheeling unit and to the connecting pipe 10 leading to the intake manifold.

Figure 4:
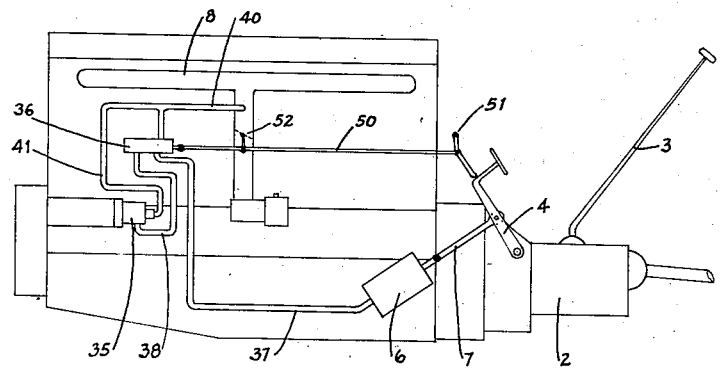
Fig. 4 shows more or less diagrammatically a modification of the invention as applied to cars which may not be equipped with a free wheeling unit.
Figure 5:
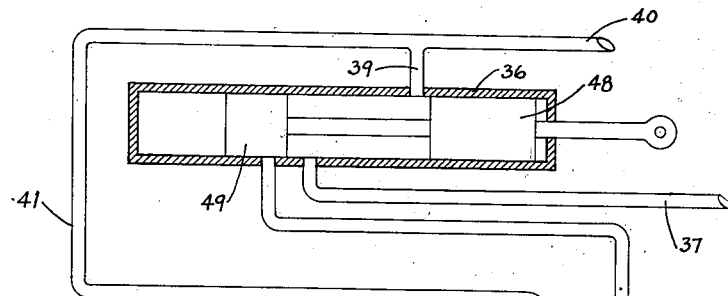
Fig. 5 is a diagram with certain parts in cross-section of the modification shown in Fig. 4.
Figure 5:
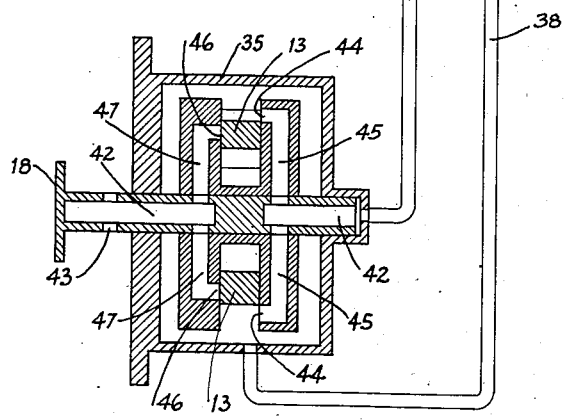

Referring to the modification of Figs. 4 and 5 which is particularly adapted to cars which are not equipped with a free wheeling unit control, the system there shown comprises an engine driven controller 35 of modified form and a piston valve 36 operating in series with the controller. The clutch operating cylinder 6 is connected with the valve 36 at a point intermediate its ends by a pipe 37 and the controller casing 35 is also connected with the valve casing 36 at a point intermediate its ends by a pipe connection 38. The casing 36 is also connected intermediate its ends with the manifold and the controller by a pipe connection 39, this pipe connection 39 leading through a pipe 40 to the intake manifold and through a pipe 41 to the hollow shaft to the hollow end of the drive shaft 42 of the controller 35. The modified controller includes the governor weights 13, similar to those of Fig. 3 and these weights control two pairs of ports. When they spring out they close ports 44 which lead down through passages 45 to the hollow end 42 of the controller drive shaft and conversely when they move inwardly they open these ports. These weights also control a pair of ports 46 which lead through passages 47 to the opposite end of the hollow shaft 42 and from there out through the openings 43 to the atmosphere. The hollow shaft 42 may be driven in any suitable manner from the engine, as, for example, from the coupling 18. The valve 36 is provided with a pair of spaced pistons, one an elongated piston 48 and the other a shorter piston 49, both of these being mounted on the same piston rod and operated by an operating member 50 leading to the throttle control 51. The throttle control valve is indicated at 52.

The operation is as follows:

With the car in neutral and the engine idling, the throttle 52 is closed and the valve 36 permits the vacuum to communicate directly with the clutch cylinder 6. The clutch is hence disengaged. When the accelerator 51 is depressed the valve 36 closes the opening to the intake manifold through the pipe 39 and opens a port to the controller through pipe 38. From now on the action of engaging is under the action of the controller which is a simple centrifugal governor. As the engine is speeded up the governor closes the intake ports 44 and opens the air ports 46 allowing the clutch to engage. The rate of engagement is controlled as before by engine speed. A fast or slow start may be thus obtained. When it is desired to shift gears the foot is removed from the accelerator and the valve 36 closes the connection with the controller through pipe 38 and opens directly to the intake thereby disengaging the clutch. Upon depressing the accelerator the clutch is engaged. Again the clutch may be engaged rapidly or slowly at the driver's will. By hinging the fly weights as before, this action becomes more flexible and better control is obtained.

The modification according to Fig. 6 comprises a piston valve 50 including two pistons 51 and 52 mounted on the same piston rod, which pistons are operated by a governor flap valve operating member 53 disposed in the intake riser 54 above the carburetor 55 and also by suction pressure. The valve casing is connected with the clutch operating cylinder 6 by a pipe 56 leading to a port 57 intermediate the ends of the cylinder 50. The lower end of the cylinder 50 is provided with a groove 58 to the atmosphere which is controlled by the piston 52. The casing 50 communicates with the riser 54 at a point below the flap 53 through a passage 59. The shut-off point of this passage is indicated at 60 and when the piston 51 moves below this point 60 the direct communication between the riser 54 and the cylinder 6 is cut off. The throttle valve is indicated at 61 and at 62 I have indicated diagrammatically a hand control means for this throttle.

The flap 53 is provided with idling opening 53' and is pivoted at 62 and is provided with a bell crank arm 63 for engaging the extension 64 of the piston valve rod, the bell crank 63 being provided with a bearing surface 63' for engaging the upper end of the valve rod 64. The flap 53 is moved about the pivot point 62 in the upward direction by the charge flowing up to the engine, this charge, of course, being controlled by the throttle 61. When the charge reaches a predetermined velocity, the flap moves upward thereby closing the vacuum connection between the cylinder 6 and the manifold at 60. After opening the connection to the atmosphere at 58 thereby engaging the clutch, the piston valve is returned to the clutch out position by means of the vacuum above the piston valve. For example, the vacuum in the riser 54 which is created when the throttle 61 is closed operates to lift the piston 51 to the position now shown. Preferably the ports 58 and 60 are constructed as indicated so as to obtain gradually increasing and decreasing openings by the operation of the pistons and also the port 58 begins to open slightly before the port 60 is closed. Sections of these ports are shown in Figs. 7 and 8 taken on lines 7—7 and 8—8. The preferred shape of these ports is as shown, but ports of different gradually increasing and decreasing shapes may be used if desired. This system in addition to being very simple, namely being free from any mechanical connections with the throttle mechanism, has the advantage of the selective control of the clutch. For example, it can be engaged rapidly or more slowly at the will of the driver. The sudden or quick opening of the throttle 61 results in a corresponding rapid operation of the clutch cylinder 6, but a small or very gradual opening of the throttle 61 would result in a more gradual shift of the cylinder 6 from the vacuum to the atmospheric pressure with a correspondingly more gentle or soft application of the clutch. Moreover, the member 53 is pivoted about a horizontal transverse axis 62 and, accordingly, when the throttle 61 is opened and the member 53 is lifted by the fuel stream to a position approaching a vertical position if the car should suddenly jump forwardly, namely to the left in Fig. 6, this pivoted member 53, due to the inertia effect, tends to move about the pivot 62 in a clockwise direction thereby tending to release the clutch and smooth out the starting operation. Even with the throttle 61 open there is a certain degree of vacuum in the riser while the engine is running, which vacuum results in the operation of the valves 51 and 52 to release the clutch immediately the flap 53 drops. Accordingly, if the engine should tend to stall the clutch is thrown out since the decreased velocity of fuel in the riser due to the slowing up of the engine permits the flap to fall and thereby counteracts the tendency to stall. This operation may be facilitated by a horizontal arrangement of the piston valve (which is here shown diagrammatically) or by a spring assisting the vacuum operation or both.

The modification according to Figs. 9 and 10 differs, aside from other differences, from the previously described systems as follows: In this latter system the clutch is held in engagement by vacuum and not by springs as in the above modifications. The purpose of this arrangement is to make it possible to do away with a manual throw-out mechanism entirely and to greatly simplify the construction.

Figure 10:
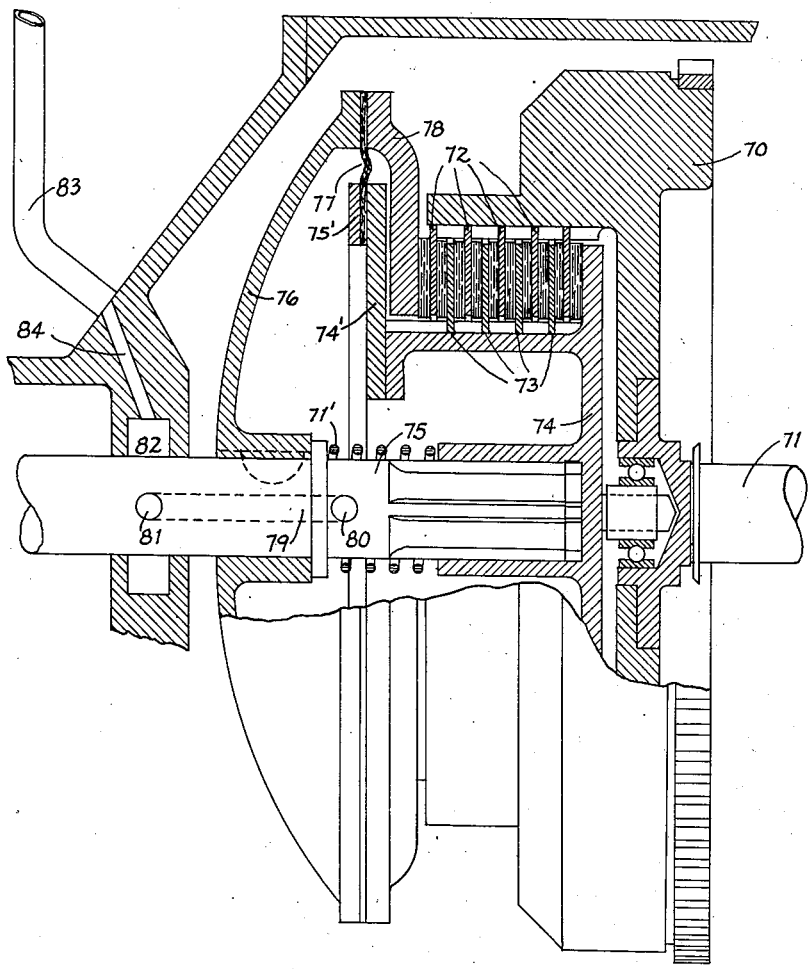

Referring to Fig. 10 the clutch comprises a fly wheel 70 secured to the end of the crankshaft 71 having sliding discs 72 which engage with the sliding friction discs 73 keyed to the driven member 74. Member 74 is splined to the driven shaft 75 permitting axial motion thereon. On the shaft 75 is mounted the dished diaphragm support 76. At its outer periphery is the flexible diaphragm 77 of annular shape which is also secured to the drum-like driven member 74 through the flange 74' and an annular clamping member 75'. This flexible joint 77 allows drum 74 to move to the left thereby pressing the friction discs 72 and 73 against each other and against the mating portion 78 of the member 76 between which is fastened the diaphragm 77. This effects a drive from the crank shaft 71 to shaft 75. The air in the sealed space between drum 74 and member 76 is exhausted through passage 79 and holes 80 and 81 in the shaft 75. Hole 81 opens to a collecting space 82 which communicates with the pipe connection 83 through passage 84. Opening 80 leads into the clutch chamber. If desired a spring 71' or other means may be provided for assuring the release of the clutch when the vacuum is released.

Figure 9:
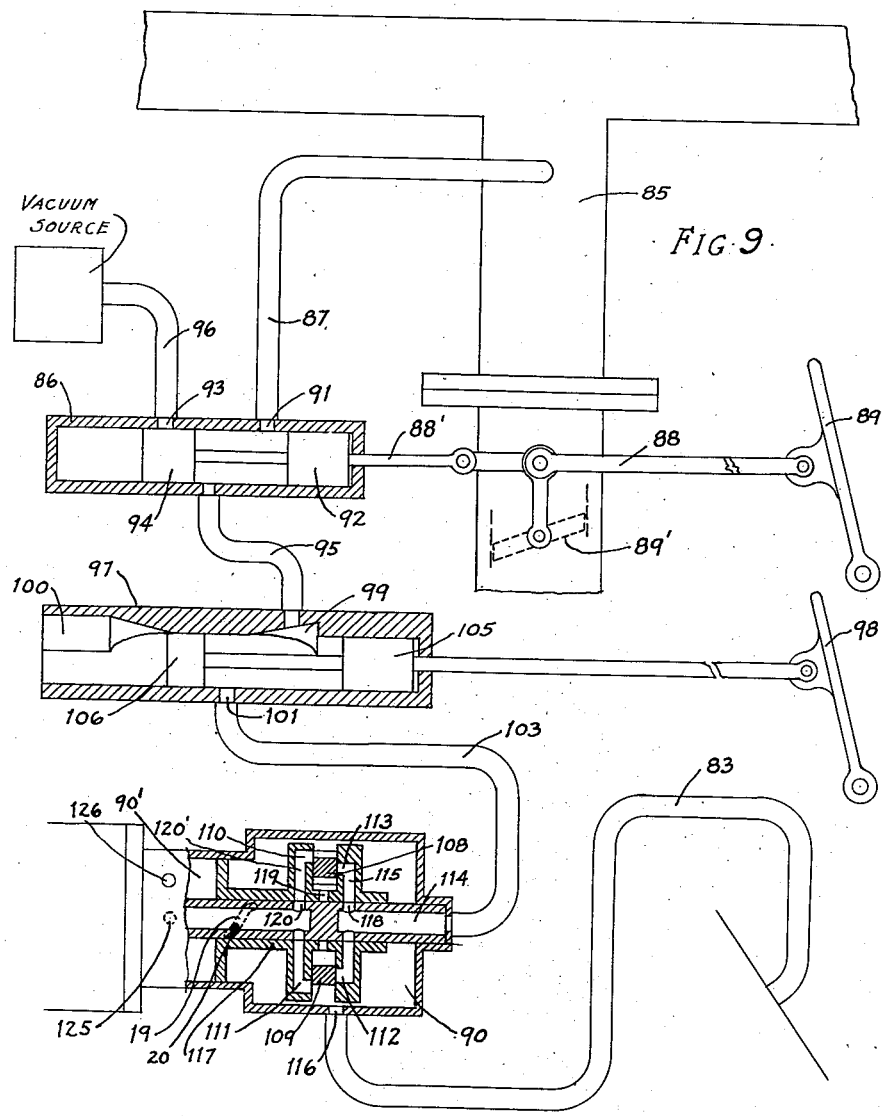
Figs. 9 and 10 show more or less diagrammatically a modified system.

The air is exhausted from pipe 83 through the controlling mechanism shown in Fig. 9. When the air is exhausted atmospheric pressure forces drum 74 to the left engaging the clutch. When atmospheric air is admitted the clutch is disengaged and the fly wheel and shaft 71 rotate freely of shaft 75.

Referring to Fig. 9 I have indicated at 85 a manifold intake riser and at 86 a valve which is connected with the riser 85 through a pipe 87. This valve 86 embodies a spool type member or double piston valve 92 and 94 which is connected with the throttle control rod 88 by means of a link connection 88', the accelerator pedal being indicated at 89 and the throttle valve at 89'. The intake port from the riser 85 is indicated at 91 and valve 86 is provided with another intake port 93 leading through a pipe 96 to an auxiliary vacuum source, as for example the fuel pump of the power plant. The purpose of this valve 86 is to determine whether the vacuum from the manifold is to be used for operating the clutch or whether the vacuum from the auxiliary source supplied through the pipe 96 is to be used. By this arrangement the vacuum in the riser to the manifold is utilized to effect the initial engagement of the clutch, while thereafter the clutch may be maintained closed by the auxiliary vacuum source through the pipe 96, notwithstanding the decrease or variations of the vacuum in the riser intake 85 due to the throttle positions.

A second valve 97 is interposed between the valve 86 and the intake 83 to the clutch operating chamber and this valve 97 is also a double piston valve controlling a port 101 on the exit side and this port 101 leads through a pipe 103 to an inertia controller 90. The latter is similar in some respects to the inertia controller as described above. The double pistons 105, 106 of this valve 97 are controlled by an auxiliary pedal 98 similar to the accelerator pedal 89. The purpose of this auxiliary pedal 98 will hereinafter appear. The valve 97 has two tapered ports 99 communicating with the vacuum pipe 95 and the other port 100 opening to the atmosphere. These ports are tapered so as to obtain gradual opening and closing of the same by the pistons 105 and 106.

The pedal 98 is an auxiliary manual control of the clutch at the will of the driver. When this pedal 98 is pressed to the full forward position, the port 99 leading to the vacuum source is closed by the piston valve 105, while the port 100 leading to the atmosphere is opened through the piston 106. The clutch is thereby disengaged. Releasing the pedal 98 cuts in the vacuum control under the influence of the accelerator pedal 89 including the inertia controller 90. By gradually releasing pedal 98 the degree of vacuum supplied to the controller may be regulated manually under the control of the operator due to the tapered shape of ports 100 and 99 which permits the gradual closing of one port and opening of the other. These ports slightly overlap and therefore facilitate this selective operation. In this way a secondary control of the clutch engagement is at the command of the driver.

The controller 90 is similar to that shown in Figs. 2 and 2a. It is responsive to engine speed and engine acceleration and deceleration. It comprises a casing in which is journalled a shaft having a hollow end 114 in communication with the pipe 103 and leading to two ports 118 and thence to ports 112 and 113 through radial passages 115 formed in the inertia part 117 of the controller. The shaft is also provided with a hollow portion communicating with ports 120 which lead through radial passages 120' and thence to ports 110 and 111. The valve members 108 and 109, which are indicated diagrammatically as the fly weights of a speed governor, control these ports 112, 113 and 110, 111. This part of the hollow shaft, namely that leading to the ports 120, is connected with the left hand part 90' of the casing through an opening 125 and from thence to the atmosphere through the opening 126. The interior of the casing in communication with ports 112, 113 and 110, 111 leads through a port 116 to the pipe 83. The inertia unit 117 is relatively rotatable upon the hollow shaft through the limits determined by the helical slot 19 and the pin 20 as above described in Fig. 2 and when this inertia unit moves endwise to the left, as for example when the engine suddenly slows down, the ports 118 are closed, the ports 120 are shut off from the passages leading to the ports 110, 111 and a direct connection to the atmosphere is provided through ports 119 and 120, resulting in the release of the clutch. The operation is as follows:

In the position shown the pipe 83 is connected to atmosphere through port 116, casing 90, ports 110, 111, ports 120, port 125, casing 90' and port 126. Accordingly, the clutch is disengaged. When the engine is speeded up by pressing the pedal 89 the fly weights 108 and 109 swing out closing ports 110, 111 and opening ports 112 and 113. Communication is thereby established from the pipe 103 to pipes 107 and 83 through the hollow shaft 114, radial passages 115, ports 112, 113 and port 116. The clutch chamber is thereby subjected to a vacuum which results in the clutch engagement. If the engine is slowed down rapidly by removing the foot from the pedal 89 the inertia unit 17 moves along the shaft to the left (Fig. 9) due to the inertia thereof and to the helical slot drive 19—20. This closes the ports 118 and connects port 119 with port 120 thereby breaking the vacuum and the clutch operating chamber through the connections above described. When the accelerator is again pressed to accelerate the engine the inertia unit 117 moves in the reverse direction to establish the connections shown in Fig. 9 and to effect the automatic engagement of the clutch.

As above described, the pedal 89, through the valve 86, shifts the vacuum supplied from the manifold to an auxiliary source. This, of course, may be effected automatically, as for example by check valves arranged to shift the communication with the intake vacuum when the riser 85 falls below a predetermined degree which vacuum is determined by the degree of opening of the throttle valve 89. Any other suitable automatic means may be provided for shifting the vacuum.

The inertia controller 90, similarly to the controller shown in Figs. 2 and 2a, effects the gradual operation of the clutch or a more rapid operation thereof depending upon the operation of the accelerator. For example, if the accelerator is operated to a sufficient degree to speed up the engine at a very rapid rate the ports 21 are very rapidly closed, while the ports 24 are rapidly opened resulting in a quick and positive operation of the clutch. On the other hand, a more gradual operation of the accelerator results in a lesser acceleration of the engine speed with a corresponding more gradual shift from ports 21 which control the throwing out of the clutch to the ports 24 which control the throwing in of the clutch. This selective gradual operation of the clutch at the will of the driver is facilitated by the overlapping of the ports 21 and 24, whereby the ports 21 remain slightly open while the ports 24 begin to open and vice versa. (Figs. 2 and 2a.) This same characteristic operation is present in Fig. 9 which also diagrammatically illustrates the inertia controller. Here the ports 110 and 111 which control the throwing out of the clutch and ports 112 and 113 which control the throwing in of the clutch slightly overlap for the same purpose.

Referring to Fig. 3a these weights 13 are shown as so formed and so mounted that the center of gravity (C. G.), with the direction of rotation A shown, is radially displaced from the drive point 14 to give the effect desired. It is shown, for example, displaced radially outwardly with respect to the point 14 so as to give an acceleration couple to effect outward movement of the weights when the engine is accelerated rapidly and a deceleration couple when the engine is decelerated rapidly. Stops 14' and 15' are indicated for limiting the inward and outward movements of the weights respectively. The weights 108, 109 are similarly constructed and mounted.

This is a continuation in part of my application Serial No. 591,043, filed February 5, 1932, and I claim the benefit of the filing date thereof for the invention claimed herein.

I claim:

1. In a clutch control system for motor vehicles the combination of an internal combustion engine, a power transmission including a clutch, an accelerator for controlling said engine and means responsive to actuation of the accelerator for shifting said clutch, including means responsive to acceleration and deceleration for governing the operation of the clutch.

2. In a system of the character set forth in claim 1 wherein the means responsive to acceleration and deceleration comprises a weight mounted in such manner as to have an inertia controlling effect for securing a smooth starting.

3. In a system of the character set forth in claim 1 wherein the means responsive to the actuation of the accelerator comprises a weight mounted in such manner as to have an inertia controlling effect for securing a smooth starting.

4. In a clutch control system for motor vehicles and the like the combination of an engine, a power transmission including a clutch, a device for controlling the power supplied to the engine, power operated means for operating said clutch and means responsive to the engine speed for controlling said power operated means, the power operated means comprising a fluid pressure operated device and a double valve control with overlapping port connections.

5. In a clutch control system for motor vehicles and the like the combination of an engine, a power transmission including a clutch, a device for controlling the power supplied to the engine, power operated means for operating said clutch and means responsive to the engine speed for controlling said power operated means, the speed responsive means comprising a centrifugal governor whose weights are mounted so as to be responsive both to the speed and to acceleration, said weights controlling the power operated means.

6. In a clutch control system for motor vehicles and the like the combination of an engine, a power transmission including a clutch, a device for controlling the power supplied to the engine, power operated means for operating said clutch and means responsive to the engine speed for controlling said power operated means, the speed responsive means comprising a centrifugal governor whose weights are mounted so as to be responsive to both the speed and deceleration, said weights controlling the power operated means.

7. In a clutch control system for motor vehicles and the like the combination of an engine, a power transmission including a clutch and a free wheeling device, power operated means for operating said clutch and an inertia controller driven by the engine and operative to throw out the clutch upon rapid deceleration of the engine.

8. In a control system for motor vehicles and the like the combination of an engine, a power transmission including a clutch and a free wheeling mechanism, power operating means for operating the clutch, and a speed governor driven by the engine for controlling said power operating means including an inertia controller also operated by the engine for controlling said power operated means.

9. In a clutch control system for motor vehicles and the like, the combination of an engine, a power transmission including a clutch, fluid pressure operated means for operating said clutch, a valve for connecting said fluid pressure operated device either with the manifold of the engine or an auxiliary source and means connected with the throttle valve of the engine for operating said valve.

10. In a clutch control system for motor vehicles, the combination of an engine, a power transmission including a clutch, means for controlling power supplied to the engine, power means responsive to said last named means for shifting the clutch, an inertia control device mounted so as to respond to acceleration, said inertia control device being operative to modify the operation of the power operative means, and being a pivoted member which responds to acceleration.

11. In a clutch control system for motor vehicles, the combination of an engine, a power transmission including a clutch, means for controlling power supplied to the engine, power means responsive to said last named means for shifting the clutch including fluid pressure operative means and a fluid pressure circuit, an inertia control device mounted so as to respond to acceleration, said inertia control device being operative to modify the operation of the power responsive means, the power operating means being a fluid control device and the inertia control element operating on the fluid pressure circuit.

12. In a clutch control system for motor vehicles and the like, the combination of an engine with a power transmission self-contained unit, including a clutch, vacuum operated means for applying said clutch directly associated therewith and a manually controlled means for controlling the pressure in the vacuum chamber of said clutch, said vacuum operative means comprising a diaphragm member fastened directly to one of the clutch elements with an air sealed chamber on one side of said diaphragm.

13. In a clutch control system for motor vehicles, the combination of an internal combustion engine having a manifold, a power transmission including a clutch, means for operatively biasing said clutch in one direction, fluid pressure means responsive to the manifold pressure for operating said clutch in the opposite direction against the biasing means, an accelerator and means responsive thereto for controlling the operation of said clutch, and means responsive to acceleration and deceleration for controlling the biasing and fluid pressure means.

14. In a clutch control system for motor vehicles, the combination of an internal combustion engine, a power transmission including a clutch, said clutch being operatively biased in one direction, a fluid pressure piston and cylinder for operating the clutch in the opposite direction against the biasing means, an accelerator for controlling the engine, valve means for connecting and disconnecting the cylinder from the manifold of the engine, means responsive to the actuation of the accelerator for controlling said valve means and means responsive to acceleration for modifying the operation of the fluid pressure means.

15. In a clutch control system for motor vehicles, the combination of an internal combustion engine, a power transmission including a clutch, spring means for biasing said clutch to an engaging position, fluid pressure operated means for disengaging said clutch against the action of said biasing spring, a connection from the fluid pressure means to the manifold of the engine, valve means in said connection for connecting the fluid pressure means either with the manifold or the atmospheric air and means responsive to acceleration and deceleration and operative upon the fluid pressure means to modify the action of the biasing means.

16. In a clutch control system for motor vehicles, the combination of an engine, a power transmission including a clutch which is normally biased to engaging position, a fluid pressure means for disengaging said clutch and holding the same in disengagement, said fluid pressure means being connected with the manifold of the engine, valve means for connecting the fluid pressure device either with the manifold or with the atmosphere, an accelerator for controlling said engine, means responsive to the actuation of said accelerator for shifting said valve, and means responsive to acceleration for modifying the action of the fluid pressure means against the biasing means.

17. An automotive vehicle comprising an internal combustion engine and a clutch, engine operated vacuum power means for operating the clutch, a clutch engaging bleed valve for said power means, a throttle for said engine, means for simultaneously operating the throttle and bleed valve, and governor means cooperating with said bleed valve to determine the mode of operation of said power means in its clutch engaging operation.

18. In vacuum operated clutch mechanism for motor vehicles, a vacuum operated clutch power unit, a control valve for the power unit, and inertia controller means for regulating operation of the clutch power unit.

19. In a vacuum operated clutch mechanism for motor vehicles, a vacuum operated clutch power unit, connections for selectively connecting one side of the power unit either solely with the manifold or solely with the atmosphere including a control valve for the power unit, and inertia controller means operatively associated with one side of the power unit for regulating operation of the clutch power unit by modifying the flow therebetween and the atmosphere, including an inertia controlled valve whose operation is unaffected by differences in pressure on the opposite sides thereof.

20. In a clutch control system for motor vehicles, in combination, an internal combustion engine having a manifold, a vacuum operated clutch power unit, connections for selectively connecting one side of said unit either with the manifold or the atmosphere, including a control valve means for connecting the unit with the atmosphere or disconnecting the same with the atmosphere while connecting it with the manifold, and an inertia controller means for regulating operation of the clutch power unit, including an inertia controlled valve for gradually regulating the flow between atmosphere and one side of the unit.

21. In a clutch control system for motor vehicles, the combination of an internal combustion engine having a manifold, a power transmission including a clutch, means for operatively biasing said clutch in one direction, fluid pressure means responsive to the manifold pressure for operating said clutch in the opposite direction against the biasing means, an accelerator and means responsive thereto for controlling the operation of said clutch, and means responsive to acceleration and deceleration for controlling the biasing and fluid pressure means, including a valve controlled by the means responsive to acceleration and deceleration for progressively regulating the flow between the atmosphere and one side of the fluid pressure means.

22. In a clutch control system for motor vehicles, in combination, an internal combustion engine having a manifold, a vacuum operated clutch power unit, connections for selectively connecting one side of said unit either with the manifold or the atmosphere, including a control valve means for connecting the unit with the atmosphere or disconnecting the same with the atmosphere while connecting it with the manifold, and an inertia controller means for regulating operation of the clutch power unit, including an inertia controlled valve progressively and gradually controlling the flow of air between the atmosphere and one side of the unit.

23. In vacuum operated clutch mechanism for motor vehicles, a vacuum operated clutch power unit, connections for selectively connecting one side of the power unit either solely with the manifold or solely with the atmosphere including a control valve for the power unit, and inertia controller means operatively associated with one side of the power unit for regulating operation of the clutch power unit by modifying the flow between the atmosphere and the unit, including an inertia controlled valve which is unaffected by differences in pressure on the opposite sides of the valve and which progressively and gradually regulates the flow.

24. In a clutch control system for motor vehicles the combination of an internal combustion engine having a manifold, a power transmission including a clutch, fluid pressure means responsive to the manifold pressure for operating said clutch, a valve for first disconnecting the fluid pressure means from the manifold and then gradually opening said means to the atmosphere, and means responsive to acceleration and deceleration for modifying the operation of the fluid pressure means.

25. In a clutch control system for motor vehicles, a vacuum operated means for actuating the clutch, manual means for disconnecting the vacuum operated means from the manifold of the engine and gradually admitting air thereto, and a valve connected with one side of said vacuum operated means whose operation is unaffected by differences in pressure on the opposite sides thereof, including a device which is responsive to acceleration and deceleration for controlling said last named valve, said valve being progressively operated to gradually regulate the flow.

26. In a clutch control system for motor vehicles, a vacuum power unit for operating the clutch, a manually controlled valve for connecting the power unit with the manifold of the engine, a passage leading from the power unit to and through the valve and to the manifold which normally is closed to the atmosphere when the valve is in position to connect the power unit with the manifold, said valve being operable to other positions to disconnect the unit from the manifold and to gradually connect the unit with the atmosphere, and an automatically controlled valve connected with one side of the unit and responsive to acceleration and deceleration to progressively regulate the flow of air between the atmosphere and the power unit.

27. The combination, with a pneumatic servo-motor for actuating the clutch controlling member of a motor car, and a valve for controlling the flow of air for operating said servo-motor, of mechanism including a valve operative by virtue of the inertia of an element thereof to operate said valve in response to acceleration and deceleration, said valve being progressively operated to closed and open position by the inertia device to gradually operate the clutch.

28. In a clutch control system for motor vehicles, the combination of an internal combustion engine having a manifold, a power transmission including a clutch, means for operatively biasing said clutch in one direction, fluid pressure means responsive to the manifold pressure for operating said clutch in the opposite direction against the biasing means, an accelerator and means responsive to the operation thereof for controlling the operation of said clutch, including a device responsive to acceleration and deceleration for controlling the biasing and fluid pressure means and operative upon either direction of movement of the motor vehicle.

29. In a clutch control system for motor vehicles, in combination, an internal combustion engine having a manifold, a vacuum operated clutch power unit, an accelerator, a control valve, communicating connections from said valve to the manifold and the clutch power unit, said valve in one position connecting said manifold with the unit and in another position disconnecting the manifold and connecting the unit with the atmosphere, and an inertia controller means for regulating operation of the clutch power unit.

30. In vacuum operated clutch mechanism for motor vehicles, a vacuum operated clutch power unit, connections for selectively connecting one side of the power unit either solely with the manifold or solely with the atmosphere, including a control valve for the power unit, and inertia controller means for regulating operation of the clutch power unit.

31. An automotive vehicle comprising an internal combustion engine and a clutch, engine operated vacuum power means for operating the clutch, a clutch engaging bleed valve for said power means, a throttle for said engine, and governor means cooperating with said bleed valve to determine the mode of operation of said power means in its clutch engaging operation.

32. In a vacuum operated clutch mechanism for motor vehicles, a vacuum operated clutch power unit, a control valve for the power unit, and inertia means for controlling the operation of the clutch power unit.

33. In a clutch control system for motor vehicles, the combination of an internal combustion engine having a manifold, a power transmission including a clutch, means for operatively biasing said clutch in one direction, fluid pressure means responsive to the manifold pressure for operating said clutch in the opposite direction against the biasing means, an accelerator and means responsive thereto for controlling the operation of said clutch, and means responsive to acceleration for controlling the biasing and fluid pressure means.

34. In a clutch control system for motor vehicles, the combination of an internal combustion engine, a power transmission including a clutch, spring means for biasing said clutch to an engaging position, fluid pressure operated means for disengaging said clutch against the action of said biasing spring, a connection from the fluid pressure means to the manifold of the engine, valve means in said connection for connecting the fluid pressure means either with the manifold or the atmospheric air and means responsive to acceleration and operative upon the fluid pressure means to modify the action of the biasing means.

35. In a clutch control system for motor vehicles, the combination of an internal combustion engine having a manifold, a power transmission including a clutch, means for operatively biasing said clutch in one direction, fluid pressure means responsive to the manifold pressure for operating said clutch in the opposite direction against the biasing means, an accelerator and means responsive thereto for controlling the operation of said clutch, and inertia responsive means for controlling the biasing and fluid pressure means, including a valve controlled by the inertia responsive means for progressively regulating the flow between the atmosphere and one side of the fluid pressure means.

36. In a clutch control system for motor vehicles the combination of an internal combustion engine having a manifold, a power transmission including a clutch, fluid pressure means responsive to the manifold pressure for operating said clutch, a valve for first disconnecting the fluid pressure means from the manifold and then gradually opening said means to the atmosphere, and inertia responsive means for modifying the operation of the fluid pressure means.

37. In a clutch control system for motor vehicles, a vacuum operated means for actuating the clutch, manual means for disconnecting the vacuum operated means from the manifold of the engine and gradually admitting air thereto, and a valve connected with one side of said vacuum operated means whose operation is unaffected by differences in pressure on the opposite sides thereof, including a device which is responsive to acceleration for controlling said last named valve, said valve being progressively operated to gradually regulate the flow.

38. In a clutch control system for motor vehicles, a vacuum power unit for operating the clutch, a manually controlled valve for connecting the power unit with the manifold of the engine, a passage leading from the power unit to and through the valve and to the manifold which normally is closed to the atmosphere when the valve is in position to connect the power unit with the manifold, said valve being operable to other positions to disconnect the unit from the manifold and to gradually connect the unit with the atmosphere, and an automatically controlled valve connected with one side of the unit and responsive to acceleration to progressively regulate the flow of air between the atmosphere and the power unit.

39. In a clutch control system for motor vehicles, the combination of an internal combustion engine having a manifold, a power transmission including a clutch, means for operatively biasing said clutch in one direction, fluid pressure means responsive to the manifold pressure for operating said clutch in the opposite direction against the biasing means, an accelerator and means responsive to the operation thereof for controlling the operation of said clutch, including an inertia responsive device for controlling the biasing and fluid pressure means and operative upon either direction of movement of the motor vehicle.

40. In a clutch control system for motor vehicles, a fluid pressure power device for operating the clutch and means for initiating the clutch engaging operation and predetermining the rate of clutch engagement, including an inertia responsive device for controlling the fluid pressure device and limiting the rate of clutch engagement.

41. An automotive vehicle comprising an internal combustion engine and a clutch, engine operated vacuum power means for operating the clutch, a throttle and means for operating it, a bleed line leading to said power means and control mechanism responsive to any particular setting of the throttle at car starting to establish a definite initial rate of clutch engagement corresponding to said setting, said mechanism comprising a bleed valve in said line together with a governor cooperating therewith to determine the mode of operation of said power means in its clutch engaging operation.

42. In automotive vehicles comprising an internal combustion engine and clutch elements, engine operated vacuum power means for controlling the clutch elements, a throttle and means for pre-setting it, and governor mechanism responsive to any predetermined setting of the throttle at starting to determine the initial rate of clutch engagement, said mechanism also including a device which is responsive to engine speed conditions for throwing out the clutch upon the approach of engine stalling conditions.

43. In a control system for motor vehicles and the like, the combination of an engine, a power transmission including a clutch, power operating means for operating the clutch, and a speed governor driven by the engine for controlling said power operating means and including an inertia controller also operated by the engine for controlling said power operated means.

JOHN O. GETTE, Jr.